United States Patent Office 3,521,124
Patented July 21, 1970

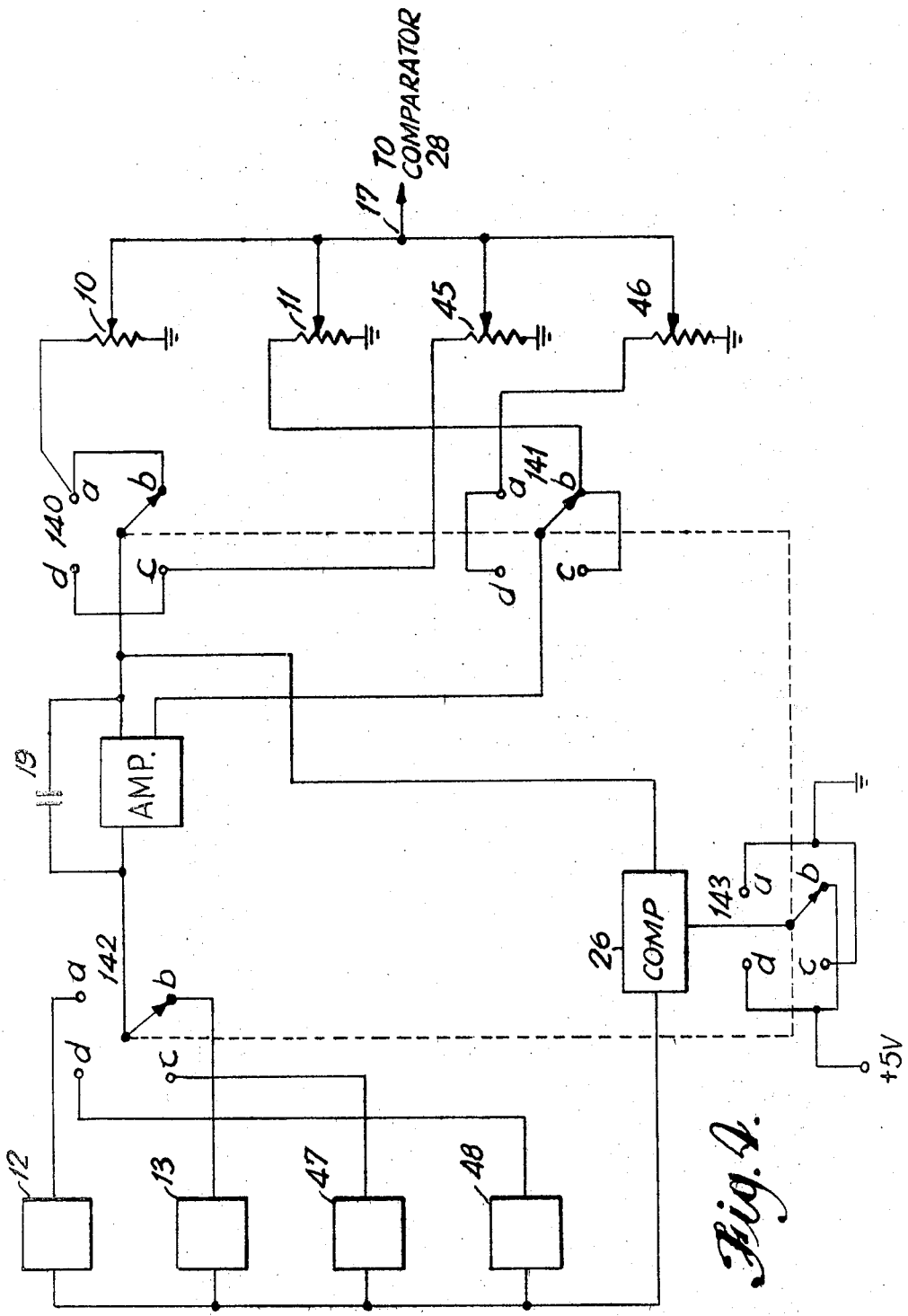

3,521,124
APPARATUS FOR PRODUCING AUTOMATIC LAMP INTENSITY CONTROL VOLTAGES
Robert Eugene Bogner, London, England, assignor to National Research Development Corporation, London, England, a corporation of Great Britain
Filed Sept. 4, 1968, Ser. No. 757,263
Claims priority, application Great Britain, Sept. 15, 1967, 42,115/67
Int. Cl. H05b 37/00, 39/00, 41/00
U.S. Cl. 315—312
12 Claims

ABSTRACT OF THE DISCLOSURE

Apparatus is described for providing a control voltage which can be changed at a predetermined rate to a predetermined value. The apparatus is useful for controlling stage or studio lighting when the control voltage controls the intensity of illumination of lamps. Hence fading from one preset intensity to another can be achieved. The apparatus may comprise an integrator coupled to an inverter, the outputs of the integrator and the inverter passing by way of variable resistors before being added to provide the control voltage. The variable resistors can be set to give the value of the control voltage and hence the intensity of illumination. Further variable resistors at the input of the integrator control the rate of integration and thus the fade time. A way of controlling the lamps using the control voltage is described.

Figure 1:
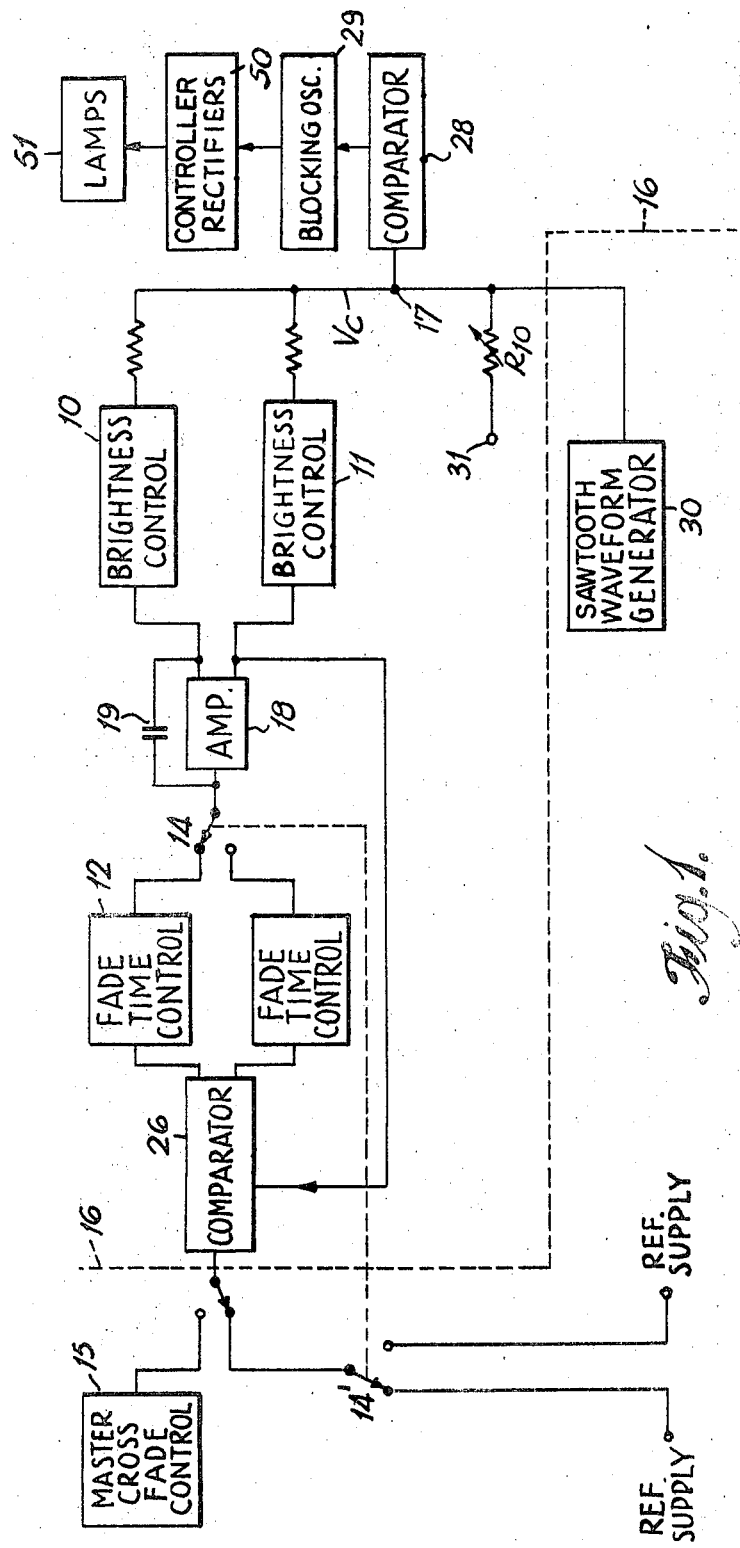

The present invention relates to apparatus for providing a control voltage which can be changed to a preset magnitude in a predetermined time. Such a voltage has useful applications particularly in the control of theatre and studio lighting.

Many theatre lighting installations suffer from the disadvantage that although a new lighting plot can be preset, fading from the old lighting plot has to be carried out manually, the rate of fading is likely to vary from one performance to another and cannot be preset, and it is difficult to fade different lamps at different rates.

According to the present invention there is provided apparatus for providing a control voltage which can be changed from an existing magnitude to a new magnitude in a variable predetermined time, including first and second voltage sources whose output voltages, are added to provide the control voltage, means for so varying the voltages from the source when the control voltage is to be changed that the voltage from one source decreases while the voltage from the other source increases, and means for selecting the rate of increase and decrease of the voltages from the sources.

Preferably the voltages from the sources decrease to zero and increase from zero. Then, before fading the control voltage is provided by one source, and after fading it is provided by the other source.

The control voltage may be used to control the brightness of a lamp or a group of lamps for stage or studio lighting. The control voltage then determines the brightness of lamps already lighting a scene, and its new magnitude can be preset for a new lighting plot. The means for selecting the rate of change of the source voltages allows fading to be carried out automatically at a preset rate.

The first source may include an integrator circuit and the second source an inverter connected to the integrator circuit. Two potentiometers are then used to set the existing control voltage and preset the new control voltage. Preferably one potentiometer is connected to the output of the integrator and the other to the output of the inverter.

A switch may be provided which enables the sources to be individually coupled to any two of a number of potentiometers, the voltages from the potentiometers being added to provide the control voltage. In this way any number of lighting plots may be preset depending on the number of potentiometers provided.

The means for varying the voltages from the sources may then include two reference-voltage supplies either of which may be selected by a switch for connection to a comparator whose output is connected to the input of the integrator. The comparator allows integration to continue until the output voltage of the integrator is equal to which ever reference-voltage supply is connected to the comparator. Thus on switching from one reference-voltage supply to the other a voltage is applied to the integrator until the integrator's output voltage reaches the reference-supply voltage and then remains steady until the switch is again operated.

The rate of change of the integrator's output is preferably controlled by selecting one of a number of resistors for connection at the integrator's input.

A switch ganged to the switch selecting the potentiometers may be used to select one of a number of groups of resistors, a resistor in the group having been preselected for a given rate of fade. Thus by selecting different resistors in different groups a number of rates of fade may be preset.

In a stage or studio lighting installation a number of channels each controlling a lamp or a group of lamps are provided. Each channel has an integrator, potentiometers at the integrator's output for controlling existing lighting intensity and the intensity of lighting in the next plot, and switches for selecting timing resistors to be connected to the integrator's input. A switch common to all channels controls change-over from one reference-voltage to the other and is operated when lighting is to be changed.

Manual control of the rate of change of the control voltage may be provided by changing over from the reference voltage supplies to a variable voltage supply. The comparator then compares the variable voltage supply with the integrator's output, and changes the control voltage accordingly.

The control voltage may be used to control the phase angle at which one or more controlled rectifiers are triggered, the rectifiers feeding a load such as a lamp or a group of lamps from an A.C. supply. The control voltage may be passed to a further comparator whose other input is provided by a sawtooth generator. In every period of the sawtooth waveform, when the instantaneous value of the sawtooth waveform exceeds the control voltage, the comparator causes an oscillator to generate a burst of pulses which fire the controlled rectifier or rectifiers.

The sawtooth generator preferably consists of an amplifier and a feedback capacitor forming an integrator, and means for discharging the capacitor periodically. A transistor may be used to discharge the capacitor, and it may be caused to conduct by the peaks of an inverted unsmoothed full-wave rectifier output voltage. The ramp portions of the sawtooth waveform may be rendered non-linear by applying the rectifier waveform to the integrator in addition to the constant voltage.

Figure 2:
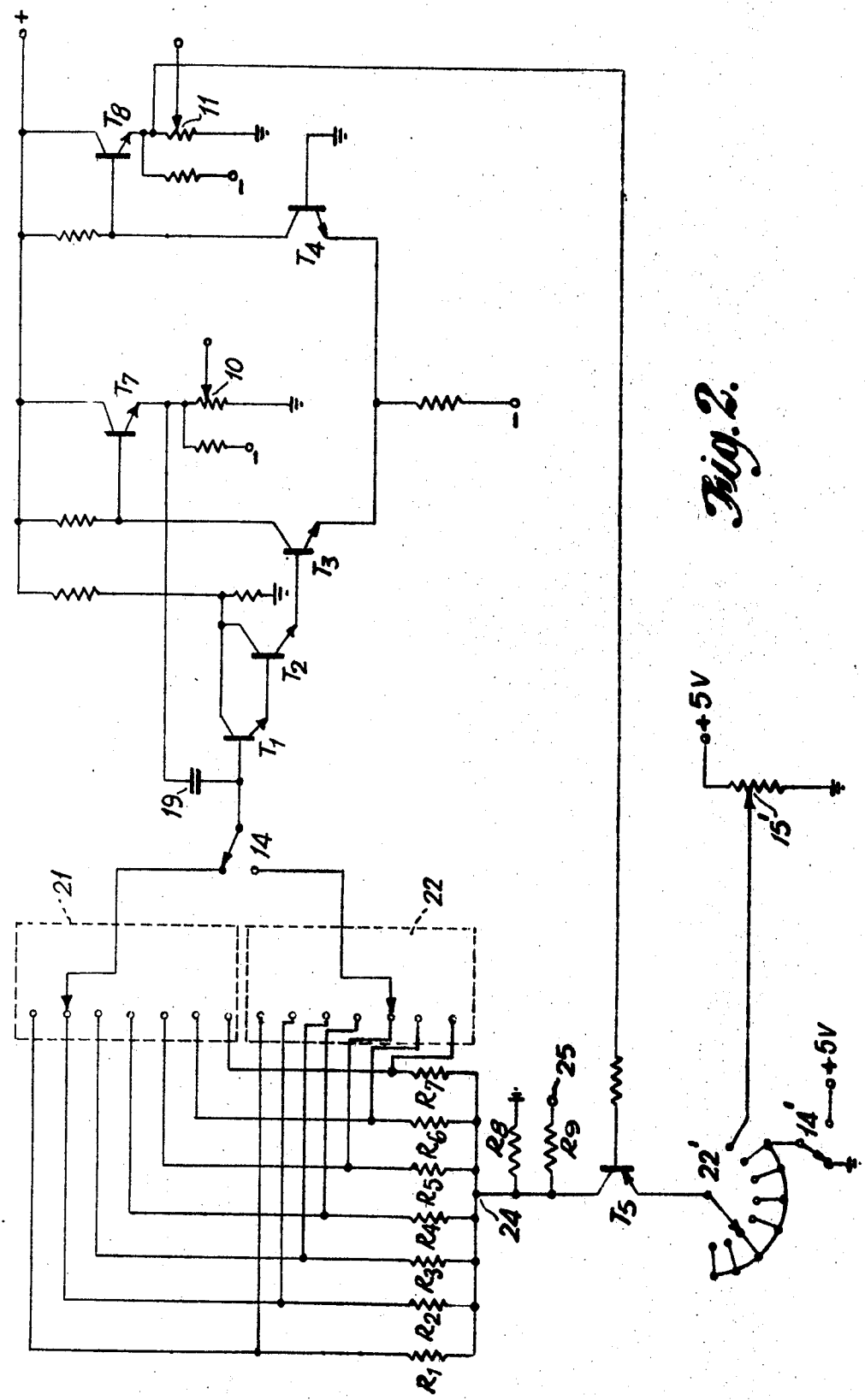
Figure 3:
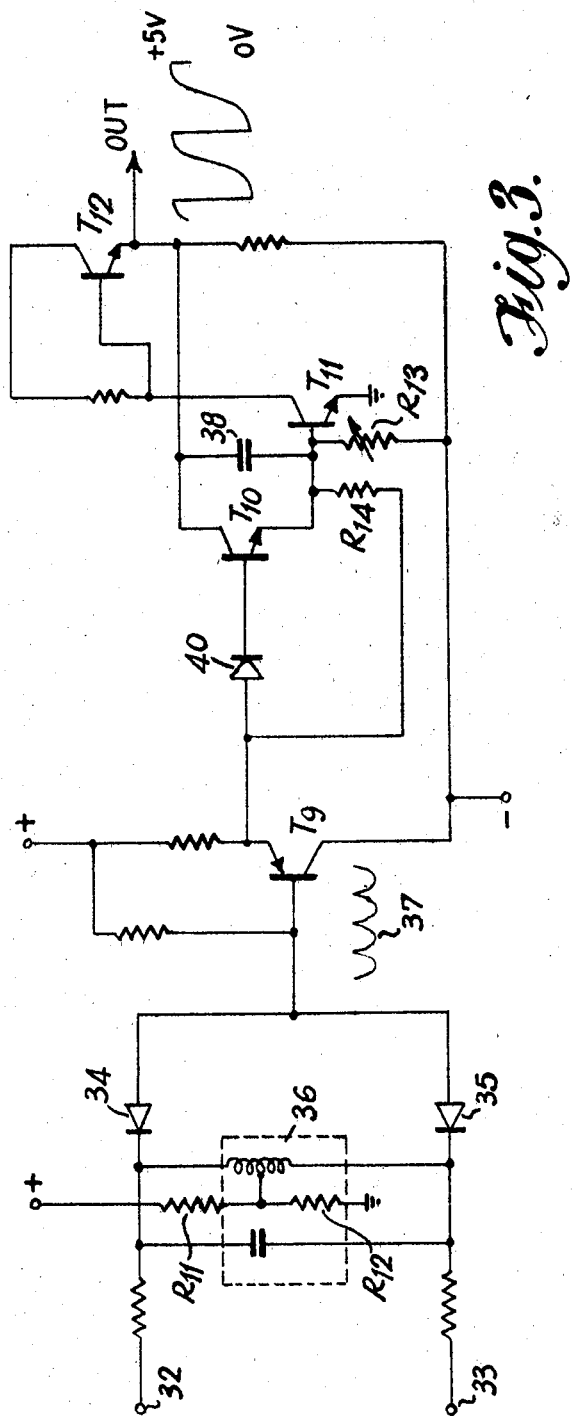

An embodiment of the invention will now be described by way of example with refernce to the accompanying drawings in which:

FIG. 1 is a block diagram of a lighting control system incorporating apparatus according to the invention, FIG. 2 is a circuit diagram of part of the block diagram of FIG. 1, and FIG. 3 is a circuit diagram of the sawtooth generator of FIG. 1, FIG. 4 is a part block—part circuit diagram of an arrangement which can be used instead of the rearrangement of FIG. 2.

A theatre lighting control system has a number of channels each of which controls the intensity of light from a lamp or group of lamps. Referring to FIG. 1, each channel has two brightness controls 10 and 11, and two time controls 12 and 13. At any time one brightness control can be used to preset a new lamp brightness and one time control can be used to preset the rate of fading to the new brightness. The other brightness control and the other time control have been used to set the present brightness.

A switch 14 known as the series switch is common to all channels and when operated initiates change on all channels to a new lighting plot. A common manual control 15 known as the master cross-fade control can be switched into operation if manual control of the rate of fade is required. Apparatus required for each channel is shown to the right of the dotted line 16, while apparatus common to all channels is shown to the left of this line.

In operation a control voltage $V_c$ is provided at the point 17, and this voltage is used to trigger controlled rectifiers passing current to lamps controlled by the apparatus FIG. 1. The way in which the control voltage $V_c$ is applied to control lamps will be described in more detail below.

The control voltage is obtained by adding proportions, selected by the brightness controls 10 and 11 of two voltages from a Miller integration circuit which includes an amplifier 18 and a feedback capacitor 19. The amplifier 18 includes two transistors $T_1$ and $T_2$ forming an input stage, a differential-amplifier stage formed by transistors $T_3$ and $T_4$ which gives two output signals, one inverted with respect to the other, and two output stages, one for each output of the differential-amplifier stage provided by transistors $T_7$ and $T_8$. Output signals from the transistor $T_7$ are fed back by way of the capacitor 19 to the input of the amplifier 18 at the base of the transistor $T_1$.

It is probably better to use field-effect transistors instead of the transistors shown in FIG. 2 for the transistor $T_1$ and possibly the transistor $T_2$. The circuit will then require modification according to the known methods of operating field-effect transistors.

The voltage to be integrated is applied to the amplifier 18 through a selected one of resistors $R_1$ to $R_7$. These resistors are chosen to give the integrator a selectable time-constant giving a suitable range of rates of fade. Thus the rate of change of the control voltage for fading to a new lighting plot is selected by setting that one of switches 21 and 22 which is not connected by the switch 14 to the amplifier's input.

A comparator 26 includes a transistor $T_5$ and allows integration to take place if the ouput voltage at the emitter of the transistor $T_8$ is different from a selected one of two reference voltages, for example, 0 v. and +5 v., which are coupled by way of a separate section 14' of the switch 14 to the emitter of the transistor $T_5$.

The comparator functions in the following way: within the limitations of the amplifier 18 a constant voltage applied at the common point 24 of the resistors $R_1$ to $R_7$ will cause a linearly changing voltage to appear at the integrator's output. This output voltage will continue to change until the transistor $T_5$ stops the change. For example, if the transistor $T_5$ is made to conduct by applying the positive reference voltage to its emitter, the point 24 becomes positive and the emitter of the transistor $T_8$ becomes increasingly positive at a controlled rate until eventually the current through the transistor $T_5$ is reduced when its base becomes nearly as positive as its emitter, and the positive input to the integrator is removed.

When the transistor $T_5$ is cut off completely by connecting its emitter to earth the input to the integrator goes negative and the emitter of the transistor $T_8$ follows at a controlled rate until the transistor $T_5$ conducts sufficiently to remove the integrator's negative input.

The output of the comparator is now considered in more detail. When describing the action of the transistor $T_5$ the emitter and base are assumed to be at the same voltage when the transistor conducts. When the transistor $T_5$ is not conducting the voltage at the point 24 is −5 v. if resistors $R_8$ and $R_9$ are equal and the voltage applied at terminal 25 is −10 v. When the transistor $T_5$ conducts heavily the voltage at the point 24 becomes +5 v.

Just before a lighting change is made the control voltage will be steady and the voltage at one output terminal of the amplifier 18 will be at its minimum. Assuming the emitter of the transistor $T_8$ is at earth potential, input voltage at the point 22' must be at earth potential.

When lighting is to be changed that one of the switches 21 and 22 not connected to the amplifier 18 is used to select one of the resistors $R_1$ to $R_7$ and hence the rate of fade, and the switch 14, 14' is operated bringing the newly selected one of the resistors $R_1$ to $R_7$ into circuit and connecting the +5 v. supply to the emitter of the transistor $T_5$, turning this transistor on. The voltage at the point 24 arises to its maximum of +5 v. and the voltages at the emitters of the transistors $T_7$ and $T_8$ change at a controlled rate. In particular that at the emitter of the transisor $T_8$ rises to +5 v. when it allows the transistor $T_5$ to conduct only sufficiently to keep the output voltages of the integrator constant.

When a further lighting change is required one of the resistors $R_1$ to $R_7$ is chosen to control the rate of fade, and the switch 14, 14' is again operated. The transistor $T_5$ becomes cut off since its emitter is connected to earth, and the voltage at the point 24 falls to −5 v. Consequently the emitter voltage of the transistor $T_8$ falls until the base of the transistor $T_5$ is just negative and it again conducts sufficiently to keep the integrator output voltages constant.

Thus it can be seen that the voltage at the emitter of the transistor $T_5$ is compared with that at its base and if there is any difference the output voltages of the integrator change at a controlled rate until the difference disappears.

A section 22' of the switch 22 connects the emitter of the transistor $T_5$ to the switch 14 in positions corresponding to the connection of one of the resistors $R_1$ to $R_7$ but has one further position for manual control of the rate of fading in which voltage from a potentiometer 15' providing manual fading control is applied to the emitter of the transistor $T_5$. As before transistor $T_5$ acts as a comparator causing the integrator to produce a control voltage which is the same as a reference voltage, but now the reference voltage is varied during fading at a rate determined by an operator.

The brightness controls are shown as potentiometers 10 and 11 connected at the output terminals of the amplifier 18 in FIG. 2. Proportions of the integrator output voltages determined by the setting of these potentiometers are added at point 17, and since the voltages change linearly during fading the control voltage obtained also changes linearly. At the end of fading one of the integrator output voltages is zero and the other is +5 v. since these are the reference voltages applied to the comparator 26. The lamp brightness after fading depends on the proportion which is applied to the point 17 of that integrator output voltage which rises to +5 v., since at the end of fading the other output voltage is zero.

A comparator 28 causes a blocking oscillator 29 to provide bursts of oscillations triggering semi-conductor controlled rectifiers 50 at a point in each cycle of an A.C. supply, depending on the voltage. Separate rectifiers are provided for each channel and are connected in series with the lamps 51 of that channel across the supply.

The voltage applied to the comparator 28 is the sum of the control voltage, a sawtooth voltage from a waveform generator 30 and a negative supply voltage applied from a terminal 31 by way of a variable resistor R10. The repetition frequency of the sawtooth voltage is twice that of the A.C. supply so that there is one "sawtooth"

for each half cycle of the A.C. supply. The comparator again takes the form of a transistor (not shown) which conducts when the voltage applied to its base from the point 17 exceeds the voltage at its emitter. Adjusting the resistor R10 allows the voltage present at the point 17 at any given point in the A.C. supply cycle to be adjusted and allows adjustment of the triggering phase angle of the rectifiers.

The output circuit of the blocking oscillator includes a transformer (not shown) whose secondary applies bursts of pulses to a "Triac," that is a semi-conductor controlled rectifier device which conducts in either direction, when it receives a trigger pulse and is biased in that direction. Conduction ceases when the bias voltage falls to near zero, and is started again when the bias voltage has risen and a further trigger pulse has been applied. When the Triac gate conducts it becomes effectively a short circuit and to prevent the output of the blocking oscillator also becoming short circuited, with adverse effects on the magnitude and reception frequency of its output pulses, a low resistance of about 10 ohms is connected in series with the output transformer's secondary winding.

The R.M.S. voltage from the Triac and hence the intensity of the light from the lamps connected thereto is not linearly related to the firing angle. Thus the voltage applied at the point 17 must be shaped to compensate for this non-linearity. To achieve this compensation the rate of change of the sawtooth waveform is reduced at beginning and end of each "sawtooth" as shown in FIG. 3. The waveform generator 30 shown in detail in FIG. 3 has input terminals 32 and 33 supplying a full-wave rectifier circuit consisting of diodes 34 and 35 by way of a parallel resonant circuit 36 acting as a filter to prevent all frequencies except the supply frequency from reaching the rectifier circuit. The rectified output voltage is not smoothed and has a waveform which is as shown at 37. Its peak magnitude is made convenient for the subsequent transistor circuit by a voltage applied through resistors R11 and R12 to a centre tap of the inductor of the resonant circuit 36.

The unsmoothed voltage is buffered by a transistor $T_9$ and used to cause a transistor $T_{10}$ to conduct periodically, shorting a capacitor 38. The capacitor is part of an integrator circuit including the transistors $T_{11}$ and $T_{12}$. A negative voltage is applied by way of a variable resistor $R_{13}$ to the input of the integrator and gives rise to the positive going sawtooth waveform which reverts to zero voltage when the transistor $T_{10}$ conducts. In order to shape the sawtooth waveform in the way required the input voltage for the integrator is made less negative at the beginning and end of each "sawtooth" by a voltage applied by way of a resistor $R_{14}$. This voltage is most negative at the middle of each "sawtooth" and becomes less negative at the beginning and end thereof.

The diode 40 prevents breakdown of the transistor $T_{10}$ with excess reverse base-emitter voltage.

It is often useful to be able to set more than one lighting plot in advance, and to preset the times of fade between these advance plots. Any number of advance plots and fades can be set with apparatus according to the invention, and FIG. 4 shows apparatus for setting three lighting plots in advance.

In FIG. 4 the same designations have been used, where appropriate, as are used in FIGS. 1 and 2. FIG. 4 shows four brightness-control potentiometers 10, 11, 45 and 46. Switches 140 to 143 are gauged together and form the series switch for changing from one lighting plot to another. The switches 140 and 141 are connected to the output of the amplifier 18 and the inverted output thereof, respectively. The reference supplies for the comparator 26 are applied by way of the switch 143, and one of four fade-time controls 12, 13, 47 and 48 is selected by way of the switch 142. As in FIG. 2 the fade-time controls include a group of resistors and a switch for selecting one resistor as part of the integrator circuit.

The series switch of FIG. 4 is set to the second of four lighting plots a, b, c and d which letters also designate the contacts of the switches 140 and 143. The brightness of the lamps for plots c, d and a can now be set by adjusting potentiometers 45, 46 and 10, and the fade-times between plots can be set by adjusting fade-time controls 47, 48 and 12.

When lighting is to be changed the series switch is operated so that its wipers make contact with contacts c. A new reference voltage is applied by switch 143 to the comparator 26, and amplifier output voltage increases from zero while its inverted output decreases to zero. Thus the voltage selected at the potentiometer 11 falls while that at the potentiometer 45 rises. The rate of change of these voltages depends on the fade-time control 47 now selected by the switch 142.

It can be seen that any number of advance plots can be set if a corresponding number of brightness-control potentiometers are provided. Similarly the number of fade-time controls provided will determine how many fade-times can be preset. By appropriate switch wiring different numbers of brightness controls and fade-time controls can be provided in any one lighting control apparatus.

An advantage of a lighting control system incorporating apparatus according to the invention is that it can be built up channel by channel, the equipment required for each channel being inexpensive compared with a complete complex lighting control system which does not use resistive dimmers. Consequently small installations of, if required, only a few channels can be constructed where otherwise a complete complex system which cannot be split into small working units would have to be obtained.

While the invention has been described in connection with a specific example, other embodiments of the invention will be apparent which do not depart from the spirit and scope of the invention.

I claim:

1. Apparatus for providing a control voltage which can be changed from an existing magnitude to a new magnitude in a variable predetermined time, including first voltage means for providing a first voltage, second voltage means for providing a second voltage, addition means for adding said first and second voltages to provide a control voltage, variation-control means for increasing one of said first and second voltages and decreasing the other of said first and second voltages when it is desired to change said control voltage, and, rate-control means coupled to said variation-control means to control the rate of increase and decrease of said first and second voltages.

2. Apparatus according to claim 1 wherein said first voltage means includes integrating means whose output provides said first voltage, said second voltage means includes inverter means for inverting said first voltage to provide said second voltage, and said rate-control means controls the rate of integration carried out by said integrating means.

3. Apparatus according to claim 2, including, at least one pair of first variable-resistance means, one of said pair of variable resistance means being coupled between said addition means and the output of said integrating means, and the other of said pair of variable resistance means being coupled between said addition means and said inverter means whereby a proportion of said first and second voltages can be passed to said addition means.

4. Apparatus according to claim 2, including first and second reference-voltage sources, first switch means for selecting one of said sources at a time for coupling to said integrating means, comparator means, for comparing the output voltage of said integrating means with the voltage of that one of said sources for the time being coupled thereto, to halt integration when the output voltage of said one source equals said output voltage, whereby when said first switch means is operated to change from one of said sources to the other, said output voltage changes at a rate dependant on said rate control means until it equals the voltage of said other source.

5. Apparatus according to claim 4 wherein said rate-control means includes a plurality of second variable resistance means, and second switch means, ganged to said first switch means, for selecting one of said second resistance means for coupling to the input of said integrating means, whereby when it is desired to preset a rate of change of said control voltage, one of said second resistance means is set accordingly, and when said desired rate of change is to take place said first and second switch means are operated to couple that one of said reference-voltage sources not already connected and the said one resistance means, respectively, to said integrating means.

6. Apparatus according to claim 4 including a plurality of pairs of third variable resistance means, third switch means for connecting one said third variable resistance means of one pair after another in sequence to the output of said integrating means, fourth switch means for connecting the other said third variable resistance means of one pair after another in sequence to said means for providing an inverted output, said third and fourth switch means being ganged together and allowing alternately as they are operated first a new one of said third resistance means to be connected to the output of said integrating means without changing that one of said third resistance means connected to said inverter means, and then a new one of said third resistance means to be connected to the output of said inverter means without changing that one of said third resistance means connected to said integrating means, and so on.

7. A lighting installation including a plurality of groups of lamps, first and second reference-voltage sources, and a number of control means, one for each said group, for providing a voltage controlling the intensity of illumination of the lamps in said group comprising switch means for coupling said first and second voltage sources, one at a time, to integrating means, inverting means coupled to the output of said integrating means, comparator means for comparing the output voltage of said integrating means with the voltage of that one of said sources for the time being coupled thereto, to halt integration when the output voltage of said one source equals said output voltage, fade-time control means for controlling the rate of integration carried out by said integrating means, and addition means for adding the output voltages of said integrating means and said inverting means to provide an output control voltage from said control means, the said switch means of all the said control means being ganged together to allow all said control means to switch from one said reference-voltage to the other at the same time.

8. A lighting installation according to claim 7 wherein each control means includes a plurality of pairs of third variable-resistance means, third switch means for connecting one said third variable-resistance means of one pair after another in sequence to the output of said integrating means, fourth switch means for connecting the other said third variable resistance means of one pair after another in sequence to said means for providing an inverted output, said third and fourth switch means being ganged together and allowing alternately as they are operated first a new one of said third resistance means to be connected to the output of said integrating means without changing that one of said third resistance means connected to said inverter means, and then a new one of said third resistance means to be connected to the output of said inverter means without changing that one of said third resistance means connected to said integrating means, and so on.

9. A lighting installation according to claim 8 including a manually-controlled variable reference-voltage source, means for coupling said manually-controlled source to said integrator instead of said first or second voltage source to provide a manual control of rate of change of fade.

10. A lighting installation according to claim 8 wherein each control means includes generator means for providing a sawtooth waveform, further comparator means for comparing the said output control voltage with the instantaneous voltage of said sawtooth waveform, a plurality of controlled rectifiers coupled to said lamp, the comparator causing said rectifiers to conduct when said instantaneous voltage rises above said output control voltage.

11. A lighting installation according to claim 10 wherein the generator provides a non-linear sawtooth waveform in which the rate of change of voltage decreases at the ends of the comparatively slowly changing portion of the waveform.

12. A lighting installation according to claim 10 wherein said generator means includes an amplifier and a feedback capacitor forming a further integrator, a transistor connected across said capacitor, a full-wave rectifier having an inverted unsmoothed output in which peak voltages occur periodically when said rectifier is connected to an alternating current supply, means for causing said transistor to conduct, shorting out of said capacitor, when said peaks occur.

References Cited
UNITED STATES PATENTS

| | | | |
|---|---|---|---|
| 3,448,338 | 6/1969 | Bentham et al. | 315—295 |
| 3,256,463 | 6/1966 | Davis | 315—158 |
| 3,265,932 | 8/1966 | Pettersson | 315—292 |
| 3,231,784 | 1/1966 | Major | 315—312 |
| 3,221,214 | 11/1965 | Wolff | 315—292 |

JOHN W. HUCKERT, Primary Examiner

B. ESTRIN, Assistant Examiner

U.S. Cl. X.R.

315—194, 199, 296, 314, 318, 320